Oct. 16, 1951    G. FAST    2,571,352
SHAFT SEAL
Filed March 29, 1945    2 Sheets-Sheet 1
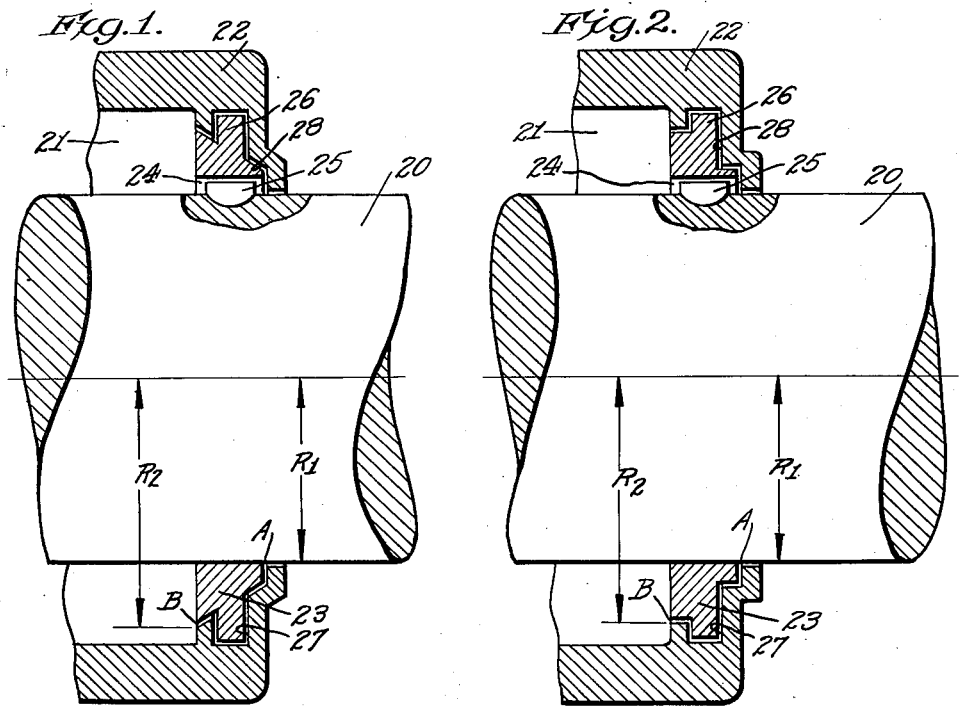
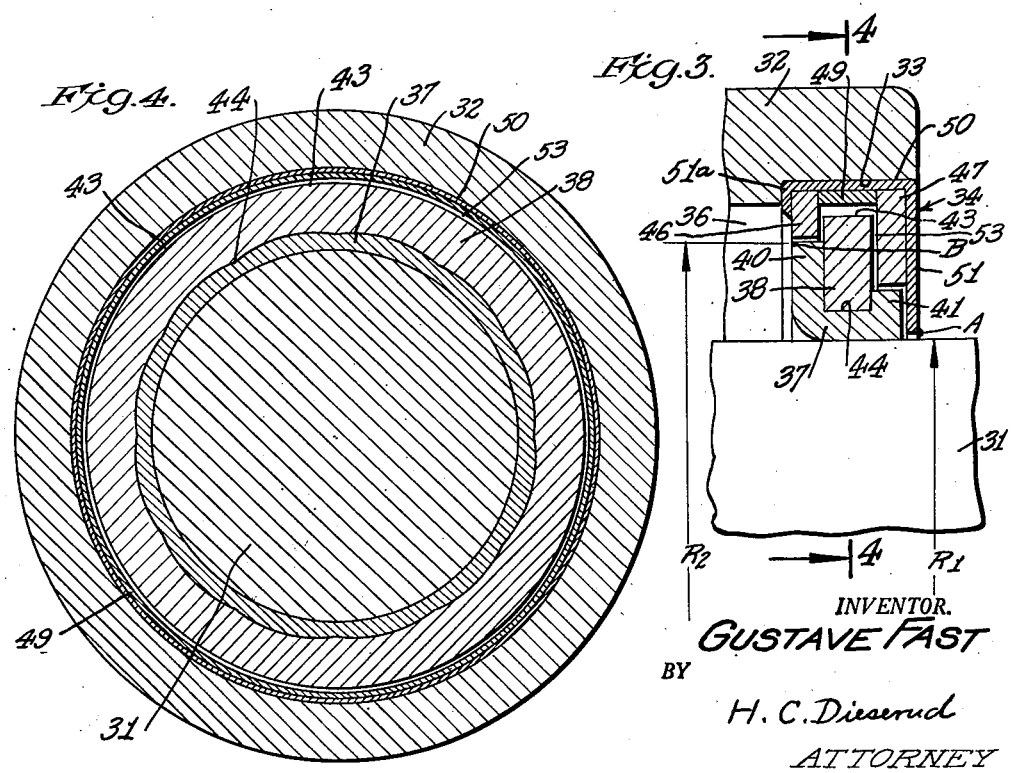
INVENTOR.
GUSTAVE FAST
BY
H. C. Dieserud
ATTORNEY Oct. 16, 1951     G. FAST     2,571,352
SHAFT SEAL
Filed March 29, 1945     2 Sheets-Sheet 2
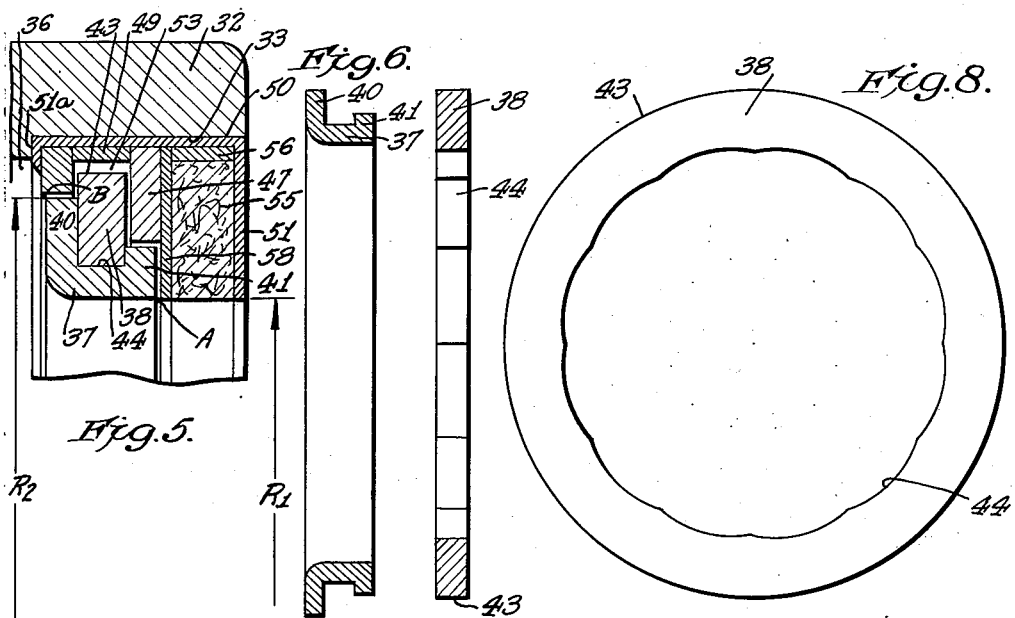
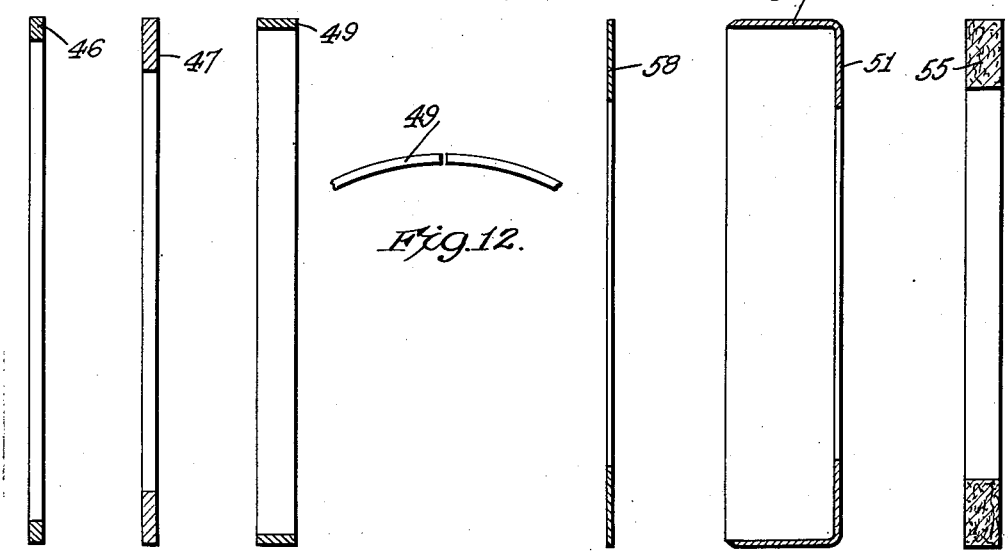
INVENTOR.
GUSTAVE FAST
BY
H. C. Diesend
ATTORNEY Patented Oct. 16, 1951

2,571,352

UNITED STATES PATENT OFFICE 2,571,352

SHAFT SEAL

Gustave Fast, Salisbury, Md.; Frederick W. C. Webb, administrator of said Gustave Fast, deceased, assignor to Christiane Ganna Fast Application March 29, 1945, Serial No. 585,412

4 Claims. (Cl. 286—5)

1

This invention relates to a new and improved shaft seal for sealing a liquid, such as lubricating oil, within its receptacle, such as a gear case or bearing housing or the like, in such a manner as to prevent its escape along a rotating shaft protruding from the receptacle. It is especially concerned with a new and improved unitary device that can be readily applied to existing machinery, without requiring modification or machining of the rotating shaft, and which will provide an efficient seal to prevent the escape of lubricating oil or other liquid along the shaft.

In the lubrication of machinery, such as electric motors, steam turbines, centrifugal blowers, pumps and other machines including rapidly rotating parts, it is frequently necessary to provide a receptacle or housing as a part of the machine for retaining lubricating oil or some other liquid. Preventing the escape of this liquid along the rotating shaft which protrudes from the housing has always been a particularly difficult problem. It is especially difficult in such cases in which the lubricating oil must be retained at a fairly high level within the housing to insure adequate lubrication of the relatively sliding surfaces. This is the situation in a gear casing or bearing housing, since a substantial quantity of oil must be retained and this, during operation of the machine must be widely distributed. Unless special precautions are taken, therefore, it will readily escape along the rotating shaft which must protrude from at least one end and sometimes both ends of the enclosure.

Various attempts have been made to prevent the escape of lubricant or other liquid along a rotating shaft under the conditions specified, but such attempts have been generally unsatisfactory, since they have depended primarily on rubbing contact between a stationary member, usually made of leather or rubber or the like, and the rotating shaft. It has usually been necessary to apply pressure between this stationary flexible member and the rotating shaft, frequently by means of a spring, in order to prevent the escape of oil or other liquid along the shaft. Unfortunately, the coefficient of friction between the steel shaft and a flexible sealing material of the character specified is relatively high, resulting in the dissipation of considerable mechanical energy in the form of heat. This generation of heat creates a serious problem with machinery of this type having a rotating shaft, and necessitates limiting the speed of rotation (revolutions per minute) to a relatively low value, ordinarily much below the rotational speeds at

2 which modern high speed machinery is otherwise designed to operate.

When employing rubbing seals of the type now customary for preventing liquid escape along a rotating shaft, the linear rubbing velocity of such a seal against the steel shaft is generally limited to from 800 to 1000 feet per minute. This means that the rotational speed of a steel shaft three inches in diameter, for example, is limited to about 1270 revolutions per minute. Since steam turbines, centrifugal blowers, pumps, and other types of high speed machinery having shafts approximately three inches in diameter ordinarily operate at rotational speeds of from 5000 to 6000 or more revolutions per minute, it is evident that shaft seals of the customary type now available can not properly be used on apparatus of this character. I have found, in fact, that if a bearing housing has two shaft seals of this type, having flexible material rubbing with substantial pressure against the shaft, these two shaft seals, even at moderate speeds, generate an amount of heat which is greater than that generated by the bearing itself operating with a considerable load.

With the defects of presently available shaft seals for preventing the escape of a liquid such as lubricating oil along a shaft in mind, I have developed certain new and improved shaft seals which operate in accordance with an entirely different principle. Instead of providing rubbing members for sealing the oil or other liquid and preventing its escape along the shaft, my improved shaft seals operate on the principle of providing a centrifugal pumping action in a direction opposite to that in which the oil or other liquid tends to escape, this centrifugal pumping action being directed toward the interior of the receptacle being sealed. In this way rubbing contact between sealing members under pressure is avoided, and the head under which the lubricant or other liquid is urged outwardly out of the receptacle along the shaft is offset or balanced by the head developed as a result of centrifugal pumping action tending to force the lubricant or other liquid into the receptacle in which it is intended to be retained.

My improved shaft seal is therefore characterized by very slight frictional losses and, since it does not include the usual rubbing sealing members, it is capable of utilization on apparatus designed for relatively high rotational speeds. Previously shaft seals of satisfactory character for preventing the escape of a liquid such as lubricating oil along a rotating shaft rotating at high speeds have not been available. My improved seal renders it possible, for the first time, to effectively seal lubricant or other liquid within equipment such as steam turbines, centrifugal blowers, and pumps, which normally operate at high rotational speeds, i. e., speeds in excess of 5000 revolutions per minute.

It is, accordingly, one of the objects of this invention to provide a new and improved shaft seal for sealing a liquid such as lubricating oil within a machine having rotating parts under circumstances such that escape of the liquid along the rotating shaft is prevented, this seal being capable of utilization in equipment having high rotational speeds of a type which previously could not be efficiently sealed against liquid escape.

It is another object of my invention to provide shaft seals of this type which do not include rubbing parts that are urged together under any substantial pressure, and which generate but relatively little heat due to frictional losses during operation of the machine.

It is still another object of my invention to provide shaft seals of an improved type which operate on a different principle, wherein the centrifugal pumping action developed by rotation of a member of the machine is balanced against the static head tending to urge the lubricant or other liquid out of the machine, thereby positively preventing escape of liquid along the rotating shaft.

Additional objects of my invention include providing a shaft seal having a flexible driving collar surrounding a rotating shaft, which driving collar is snugly held against the shaft so as to prevent oil or other liquid from leaking past the same along the shaft due to capillary action. This driving collar, however, rotates with the shaft and does not rub against it as do the rubbing members typical of the shaft seals now commonly available.

It is a further object of this invention to provide a flexible driving collar of synthetic rubber or other similar flexible material, which collar is firmly held against the rotating shaft for rotation therewith by means of a driven ring of a new and improved character. In this way leakage of liquid, due to capillary or other action, along the shaft is prevented. As the driving collar rotates with the shaft, even though it is pressed snugly against the shaft, even the objectionable development of heat, as a result of frictional action, does not occur.

A still further object of my invention involves providing a ring of a new and improved construction for retaining the driving collar against the shaft which is to be sealed against liquid escape. The new ring is provided with a cylindrical outer surface but the inner surface, which abuts against the driving collar of synthetic rubber or other flexible material, is of a novel scalloped contour. By providing such scalloped portions in the ring parts of the flexible driving collar are displaced at the high points and fill the low points of the scalloped portions of the ring, which thus act as a series of driving keys and also serve to force the driving collar tightly against the rotating shaft in such a manner as to prevent leakage losses as a result of capillary action.

The enumerated objects of my invention, as well as other objects and advantages which will be apparent hereinafter, can best be exemplified and explained in connection with the ensuing disclosure of certain preferred embodiments thereof.

My invention may be best described in connection with the appended drawing, wherein Fig. 1 is a cross-sectional view, certain parts being shown in elevation, of an improved shaft seal embodying a feature of my invention;

Fig. 2 is a cross-sectional view, certain parts being shown in elevation, of a shaft seal of a slightly different form which also embodies certain of the principles of my invention as herein explained;

Fig. 3 is a partial cross-sectional view, part of the rotating shaft and the lower half section of the shaft seal being omitted, of another embodiment of my invention. In this figure, a part of the shaft along which the leakage of lubricating oil or other liquid is to be prevented is shown in elevation;

Fig. 4 is a complete view in cross-section, taken at right angles to the view shown in Fig. 3, of the embodiment of my invention shown in that figure. This view is taken along the line 4—4 of Fig. 3;

Fig. 5 is a partial cross-sectional view taken axially through another embodiment of my invention. This embodiment is generally similar to that shown in Figs. 3 and 4, except that it includes a dust seal whereby access of dust to the shaft seal and its lubricant channel is avoided;

Figs. 6 to 15 illustrate the individual elements which are assembled to provide a shaft seal with the dust seal as illustrated in Fig. 5;

Fig. 6 is a cross-sectional view of the flexible driving collar formed of synthetic rubber or some similar suitable material;

Fig. 7 is a cross-sectional view of the ring provided with an interior surface of scalloped shape;

Fig. 8 is an end elevational view of the ring;

Fig. 9 is a cross-sectional view of one of the side plates forming part of the shaft seal assembly;

Fig. 10 is a cross-sectional view of another side plate of the shaft seal assembly;

Fig. 11 is a cross-sectional view of a spacer ring or band positioned between the side plates of Figs. 9 and 10;

Fig. 12 is a partial elevational view showing one portion of the circumference of the spacer ring or band of Fig. 11;

Fig. 13 is a cross-sectional view of a ring positioned between the shaft seal and outer dust seal of Fig. 5;

Fig. 14 is a cross-sectional view of a metal casing in which the entire assembly shown in Fig. 5 is enclosed; and Fig. 15 is a cross-sectional view of an outer dust seal washer formed of felt or some other suitable lightweight material.

Although Figs. 1 and 2 do not illustrate forms of my invention in which all danger of capillary oil leakage is avoided, they show embodiments which are satisfactory for many purposes. They also serve to provide a convenient simple illustration of the principles in accordance with which my improved shaft seal operates. The shaft seal constructions shown in these two figures are similar, except that the shape of the lubricant channel provided between the impeller and shaft housing differs somewhat in the two embodiments.

Referring more particularly to Fig. 1, 20 is the rotating shaft, which extends from the interior 21 to the exterior of an enclosure 22 designed to retain liquid. It may, for example, be a gear casing or bearing housing. Between the shaft 20 and an inwardly extending end wall of the housing 22 an impeller 23 is positioned. The impeller 23 is provided with keyway 24 which engages a key 25 mounted in a recess in the shaft 20. The key drives the impeller 23 so that it rotates with the shaft 21, but at the same time the arrangement permits longitudinal or axial adjustment of the shaft 20 in relation to the impeller 23. The impeller 23 is provided with a radially extending circular flange 26 fitting into a corresponding circular groove 27 in the end wall of the housing 22. Ample radial and side clearance between the impeller 23 and the housing 22 compensates for any misalignment of the shaft and provides a channel or passageway 28 for a liquid film between the impeller 23 and housing 22.

The arrangement shown in Fig. 2 is substantially identical with that of Fig. 1, except that the cooperating surfaces of the impeller 23 and the housing 22, and hence the clearance channel 28 provided between the housing and the impeller, are shaped somewhat differently. Otherwise the two constructions are identical, and the same reference numerals have been applied to corresponding parts.

As shown, the channel 28 provided between housing 22 and impeller 23, through which lubricant may pass, is spaced further from the axis of the rotating shaft 20 at its inner end, or end communicating with the interior of the liquid receptacle 21 which is to be sealed against leakage, than at its outer end. At its inner end it is spaced a distance designated as $R_2$ from the axis or centerline of the rotating shaft 20, while at its outer end, at which it communicates with the exterior of the housing 22, it is spaced a distance designated as $R_1$ from the axis or centerline of shaft 21. The lower end of the radius $R_1$ may be selected as the maximum height or level that the liquid within the housing 22 may be permitted to reach under static conditions. The pressure inside the liquid receptacle formed by the housing 22 would, of course, normally be atmospheric.

When the shaft rotates, carrying with it the impeller 23 keyed thereto, considerable agitation of the liquid within the receptacle 21 occurs resulting, for example, from the splashing caused by mating gears or the churning of lubricant by a ball or roller bearing (not shown). Some of the lubricant so agitated will seek to escape along the shaft. The impeller 23 serves to throw out radially any liquid creeping along the shaft 20 which reaches it. As the shaft and impeller rotate, any liquid which accumulates in or seeks to escape through the channel 28 between stationary housing 22 and rotating impeller 23, will be displaced, as a result of the centrifugal forces acting upon it, toward that part of the channel positioned most distantly, i. e., at radius $R_2$, from the center line of the rotating shaft 20.

The average angular speed of rotation of that body of liquid which is positioned in the channel 28 between housing 22 and impeller 23 is half the speed of rotation of the shaft 20. This follows from the fact that the first molecular layer of liquid, firmly attached to the impeller 23, rotates with the impeller at the same rotational speed as that of the impeller and shaft. Similarly, the first molecular layer of liquid in the channel 28 which is firmly attached to the housing 22 is stationary therewith, and does not rotate. Accordingly, the average speed of rotation of the liquid film in the channel 28 is one-half the rotational speed of the shaft 20 and the impeller 23.

The various mathematical factors involved should now be considered in order to determine the dynamic liquid head generated by rotation of the liquid in the channel 28. In accordance with well known hydraulic principles, this dynamic liquid head may be represented by the expression:

$$H = 0.5M[(V_2)^2 - (V_1)^2]$$

where H is the dynamic head generated in inches; M is the mass of one pound of the liquid; and $V_2$ and $V_1$ are, respectively, the rotational speeds of the impeller 23 in inches per second at the points A and B which are positioned, respectively, at distances $R_1$ and $R_2$ from the axis or center line of the rotating shaft 20.

The mass, M, of one pound of the liquid may be computed by dividing the specific gravity of the liquid, S, by $g$, the acceleration of gravity in inches/sec.$^2$. Thus computed, it may be readily substituted in the above equation in determining the dynamic head generated. The velocities, $V_2$ and $V_1$ are readily computed from the rotational speed of the shaft and impeller in revolutions per minute, and the known distances $R_2$ and $R_1$.

Taking a typical situation for purposes of illustration, $R_1$ in a given installation may be 1.50 inches, while $R_2$ is 1.75 inches. The speed of rotation of the shaft may be 1000 revolutions per minute. By computation the value of $V_2$ is found to be 91.6 inches per second, while $V_1$ is 78.5 inches per second. The value M, or the mass of one pound of the lubricating oil, may readily be computed from the specific gravity of the oil which is approximately 0.9 and the acceleration of gravity, a known physical constant, which may be taken as 386 inches/sec.$^2$.

Substituting these values in the above algebraic expression for the dynamic head developed, it is apparent that under these circumstances a dynamic head of 2.56 inches would be developed as a result of the rotation. This dynamic head tends to urge the oil film in channel 28 inwardly, toward the interior 21 of the housing 22. It is capable of balancing a static head of 2.56 inches inside the housing 22, tending to force the liquid outwardly, out of the receptacle 21, through the channel 28 from point B to point A. Under proper conditions of design the dynamic head tending to urge the oil film in channel 28 from point A to point B may be equal to or greater than the static head tending to urge the oil film out of the receptacle 21 in the reverse direction. In this way leakage of oil from the receptacle 21 out of the housing 22, past the shaft seal, is prevented. It should be noted in connection with each of the forms of seals shown in Figs. 1 and 2 that very little friction is created between the rotating and stationary parts providing the seal. Little, if any, pressure exists between the impeller and the end wall of the housing even though the shaft may shift axially as it rotates. The impeller is free to slide slightly along the shaft as the latter shifts and thus it maintains its proper relation to the housing.

While the form of shaft seal illustrated in Figs. 1 and 2 is satisfactory for many types of machinery, machining of the shaft 20 in order to receive the key 25 is required. While this may not be objectionable in many instances, it is preferable, of course, to utilize a construction which may be applied directly to existing machinery, without requiring machining or other treatment of the shaft.

Moreover, in the construction shown in Figs. 1 and 2, the fit between the impeller 23 and the rotating shaft 20 must be sufficiently loose to permit sliding, since the shaft must possess a certain degree of longitudinal freedom in many forms of apparatus, such as electric motors, where this form of shaft seal might be utilized. The looseness of the fit may permit some leakage of oil between the impeller and shaft due to capillary action. Also, in the embodiments illustrated in Figs. 1 and 2, the housing 22 must be split on the axial center line or divided in some other way so as to permit its being assembled over the impeller 23.

These disadvantages are avoided by the modified form of shaft seal constructed in accordance with the principles of my invention as illustrated in Figs. 3, 4 and 5.

Referring specifically to Figs. 3 and 4, the rotating shaft is represented by the numeral 31 and the machine housing by the numeral 32. This housing is provided at its end with a slightly enlarged bore 33 to receive the shaft seal, designated generally by the numeral 34. The bore 33 formed in the housing 32 may be somewhat smaller in diameter than the outside diameter of the shaft seal 34 in order to provide a press fit for the shaft seal, with resulting oil-tight joint.

The shaft seal 34 prevents leakage of lubricating oil or other liquid from the interior hollow 36 of the gear casing or bearing housing 32, or the like, along the shaft 31, and thence out of the housing 32.

The impeller of the construction shown in Figs. 3 and 4, corresponding to the impeller ring 23 of Figs. 1 and 2, is a composite type, consisting of a driving collar 37, formed of synthetic rubber or other suitable material, and a flat-sided impeller ring 38. The synthetic rubber driving collar 37 is U-shaped in cross-section, having the leg 40, positioned closest to the liquid receptacle 36, longer than the other leg 41. The impeller ring 38, which is preferably formed of a molded plastic material, has a cylindrical outer surface 43, and an inside surface 44 of scalloped shape, as shown most clearly in Figs. 4 and 8. When assembled on the shaft with the driving collar 37, the rubber of the driving collar is displaced and fills the scalloped portions, acting as a series of driving keys. The rubber driving collar 37 fits the shaft 31 snugly when placed in position with impeller ring 38, and thus prevents any leakage of lubricant or other liquid along the rotating shaft 31 as a result of capillary action. Both the driving collar 37 and impeller ring 38 are carried by and rotate with the shaft 31.

I have found that a molded plastic material is sufficiently strong for the impeller ring 38, and for the driving keys formed on the scalloped surface 44 thereof. Moreover, by forming the impeller ring 38 of a molded plastic, advantage is taken of the lightness of the material, thereby resulting in the development of smaller unbalanced forces, due to lack of geometrical perfection of the part or heterogeneity of the material mass, during rotation at high speeds.

The composite impeller comprising driving collar 37 and impeller ring 38 fits between annular side plates 46 and 47, which are so arranged as to provide ample side clearances with the impeller ring 38. These may be, for example, of the order of 0.010 inch to 0.015 inch. The side plates 46 and 47 are preferably formed of powdered or sintered metal capable of absorbing a considerable volume of liquid to act as a lubricant for the impeller ring 38. To insure the maintenance of the proper side clearances for the impeller ring 38, there is inserted, as shown, an annular spacer ring or band 49 between the side plates 46 and 47.

These parts are assembled and mounted in an annular metal casing 50, which, as shown, has an outer annular end wall 51 and at its inner end is spun over by a flanging operation to provide the retaining flange 51a. As previously explained, the outer diameter of the metal casing 50 is somewhat greater than the internal diameter of the bore 33 in the machine housing 32, so that the entire shaft seal assembly 34 is tightly retained in the bore 33 by a press fit.

Clearances are provided between the side plates 46 and 47 and the driving collar 37 so that there is ample radial clearance, of the order of 0.010 inch to 0.015 inch, between these members. Similarly, ample clearance is provided between the outer cylindrical surface 43 of the impeller ring 38 and the spacer ring 49 to allow for eccentricity between the rotating shaft 31 and the shaft seal bore 33 in the housing 32.

The driving collar 37 is sufficiently flexible to enable it to be readily inserted between the impeller ring 38 and the shaft to form a part of the seal 34. Its flexibility is also sufficient to permit its removal at any time, and its replacement by another driving collar of rubber or other flexible material having a different inside diameter, thereby permitting the accommodation of various shaft sizes, within certain limitations.

It is evident that the channel 53 for lubricant or other liquid extends, as shown, from point A to point B, between the metal casing 50, annular side plate 47, spacer ring 49, and annular side plate 46, on one side thereof, and the rubber driving collar 37 and impeller ring 38 on the other side thereof. Point A is spaced a distance $R_1$ from the axis or center line of the rotating shaft 31, while point B is spaced a greater distance, $R_2$, from the axis or center line of the shaft 31. As previously stated, driving collar 37 and impeller ring 38 together constitute the impeller member and rotate with the rotating shaft 31.

It is evident that the channel 53 is analogous to the channel 28 of the embodiments shown in Figs. 1 and 2. Accordingly, the same dynamic head tending to urge lubricant or other liquid in the channel 53 from point A to point B is developed as was developed in the channel 28 of the previously described embodiments. By proper design this dynamic head, developed as a result of centrifugal action and tending to urge the liquid in channel 53 inwardly toward the enclosure 36, may balance, or be greater than, the static head tending to urge the lubricating oil or other liquid outwardly through the channel 53, from the receptacle 36 to point A exterior of the housing 32. It is evident, of course, that the dynamic head developed, H, may be calculated by the formula previously given, provided the distances $R_1$ and $R_2$ are known, as well as the specific gravity of the liquid. The acceleration of gravity, $g$, of course is a physical constant, and is known for the particular locality in which the machine is located. Since its value is fairly constant at all portions of the earth's surface an approximate or average value, such as 386 inches/sec.$^2$, may be used in the computation.

The construction shown in Fig. 5 is identical with that illustrated in Figs. 3 and 4, except that an outer washer, 55, of felt or other similar lightweight material is provided as a dust seal to prevent access of dust to the oil channel 53. The use of such a felt washer 55 requires extension of the metal casing 50 with its end wall 51 and flanged-over end 51a, as shown, as well as the provision of an additional spacer ring or band 56, and an additional intermediate separator 58. In all other respects the construction is identical with that shown in Figs. 3 and 4, and the same reference numerals have been applied in both figures to denote identical parts.

The operation of the seal shown in Fig. 5 is also identical with that shown in Figs. 3 and 4, and with those shown in Figs. 1 and 2. The static head tending to urge liquid in liquid or lubricant channel 53 out of the apparatus, i. e., out of the enclosure 36 from point B to point A, is balanced, or more than offset, by the dynamic head generated by centrifugal action tending to urge the liquid in channel 53 inwardly, from point A to point B, into the receptacle. Point A is spaced a distance $R_1$ from the center line of the shaft (not shown in Fig. 5), while point B is spaced a distance $R_2$ from the center line of the shaft. When these distances are known, as well as the specific gravity of the lubricating oil or other liquid, it is possible by using the algebraic expression given above for the dynamic head H to design the shaft seal so as to prevent leakage through channel 53 from point B to point A.

In the operation of both of the forms of seal shown in Figs. 3, 4 and 5, the flexible driving member 37 is capable of sliding axially along the shaft if and when the latter shifts axially in relation to the housing. There is, therefore, no substantial pressure maintained at any time between the impeller and the housing.

In Figs. 6 to 15, inclusive, are shown the individual elements which go to make up the shaft seal, complete with the dust seal formed by washer 55 as illustrated in Fig. 5. These parts are numbered to correspond with those illustrated in Figs. 3, 4 and 5, as, in so far as they bear the same numbers, they are identical in both embodiments. As shown in Fig. 12, the spacer ring or band 49 may be split at one point on its circumference for ease in assembly. The spacer ring or band 56 may be identical with spacer ring 49, and may also be split at one point on its circumference for ease in assembly.

In my improved shaft seal there is no rubbing contact under pressure, and therefore very slight frictional losses or heat development due to friction. This permits the use of my improved shaft seal under conditions wherein the rotating mass moves at much higher rotational speeds than has heretofore been possible with shaft seals now commercially available.

It should be understood that various changes and modifications may be incorporated in my invention, certain preferred embodiments of which are herein described, without departing from the scope thereof. Thus, while I have indicated that it is desirable to employ certain materials for certain parts of the shaft seal assembly, various other materials may also be used and may, for many installations, give entirely satisfactory results. Similarly, various changes of a structural nature may be incorporated and might, in a great many cases, result in modified forms of shaft seals operating satisfactorily in accordance with the principles of my invention. It is my intention that all such changes and modifications as are within the scope of the appended claims shall be regarded as within the scope of my invention.

I claim:

1. A shaft seal adapted for sealing liquid within a housing against escape along a rotating shaft protruding therefrom which comprises: a housing provided with a cylindrical bore, and a shaft seal positioned in said bore between a portion of said housing and the rotating shaft, said shaft seal comprising: a U-shaped driving collar of flexible material and an impeller ring positioned circumferentially externally thereof, said driving collar and said impeller ring together constituting an impeller which fits snugly against said rotating shaft and is adapted for rotation therewith but shiftable freely axially thereof as the shaft shifts axially relative to the housing in the course of rotation, a casing adapted to surround said impeller and retain it between said shaft and said bore, a plurality of side spacer members for spacing said impeller from said casing, a spacer band adapted to fit within said casing and space said side spacer members apart, said spacer members and said casing being so arranged as to cooperate with said impeller to provide a channel for liquid which is to be sealed within said housing therebetween, said channel having that portion thereof adjacent the interior of said housing positioned at a greater distance from the axis of said rotating shaft than that portion thereof adjacent the exterior of said housing, whereby, upon rotation, a centrifugal pumping action on said liquid in said channel is developed, the resulting dynamic head on said liquid tending to urge said liquid toward the interior of said housing and thus serving to offset the static head on said liquid tending to cause leakage through said channel from said housing, whereby said liquid is effectively sealed in said housing against escape therefrom during rotation of said shaft.

2. A shaft seal adapted for sealing liquid within a housing through which a rotating shaft protrudes which comprises: a housing provided with a cylindrical bore, and a shaft seal positioned in said bore between a portion of said housing and the rotating shaft, said shaft seal comprising: a U-shaped driving collar of flexible material and an impeller ring positioned circumferentially externally thereof, said driving collar and said impeller ring together constituting an impeller which fits snugly against said rotating shaft, being adapted for rotation therewith, said U-shaped driving collar and said impeller ring providing, along the external circumferential surface thereof and between said surface and said housing, a channel for liquid which is to be sealed within said housing, said channel having that portion thereof adjacent the interior of said housing positioned at a greater distance from the axis of said rotating shaft than that portion thereof adjacent the exterior of said housing, whereby, upon rotation, a centrifugal pumping action on said liquid in said channel is developed, the resulting dynamic head on said liquid tending to urge said liquid toward the interior of said housing and thus serving to offset the static head on said liquid tending to cause leakage through said channel from said housing, and a dust seal positioned adjacent that part of said impeller through which said channel communicates with the exterior of said housing, whereby access of dust to said channel is prevented.

3. A shaft seal adapted for sealing liquid within a housing through which a rotating shaft protrudes which comprises: a housing provided with a cylindrical bore, and a shaft seal positioned in said bore between a portion of said housing and the rotating shaft, said shaft seal comprising: a U-shaped driving collar of flexible material, and an impeller ring positioned circumferentially externally thereof, said driving collar and said impeller ring together constituting an impeller which fits snugly against said rotating shaft and is adapted for rotation therewith, a casing surrounding said impeller and fitting within said cylindrical bore in said housing, stationary spacing members positioned in said casing between said casing and said impeller, said stationary spacing members providing, with said impeller, a channel for liquid which is to be sealed within said housing, said channel having that portion thereof adjacent the interior of said housing positioned at a greater distance from the axis of said rotating shaft than that portion thereof adjacent the exterior of said housing, whereby, upon rotation of the shaft, a centrifugal pumping action on said liquid in said channel is developed, the resulting dynamic head on said liquid tending to urge said liquid toward the interior of said housing, and thus serving to offset the static head on said liquid tending to cause leakage through said channel from said housing, and a dust seal positioned within said casing on that side of said impeller on which said channel emerges from said housing.

4. In a shaft seal adapted for sealing liquid within a housing against escape along a rotating shaft protruding therefrom, an impeller ring surrounding said shaft and serving to press a flexible material in contact therewith, said impeller ring being provided with a scalloped internal surface in contact with said flexible material which acts as a series of driving keys to press said flexible member in contact with said rotating shaft for rotation therewith.

GUSTAVE FAST.

REFERENCES CITED

The following references are of record in the file of this patent:

UNITED STATES PATENTS

| Number | Name | Date |
|---|---|---|
| 978,310 | Kruger | Dec. 13, 1910 |
| 1,105,268 | Gohlke | July 28, 1914 |
| 1,724,902 | Bentley | Aug. 20, 1929 |
| 1,919,248 | Murphy | July 25, 1933 |
| 1,999,662 | Nell | Apr. 30, 1935 |
| 2,137,546 | Searles | Nov. 22, 1938 |
| 2,248,405 | Freeman | July 8, 1941 |